Jan. 17, 1956  W. F. BRUCE ET AL  2,730,892
MELTING POINT BAR
Filed May 22, 1952  2 Sheets-Sheet 1
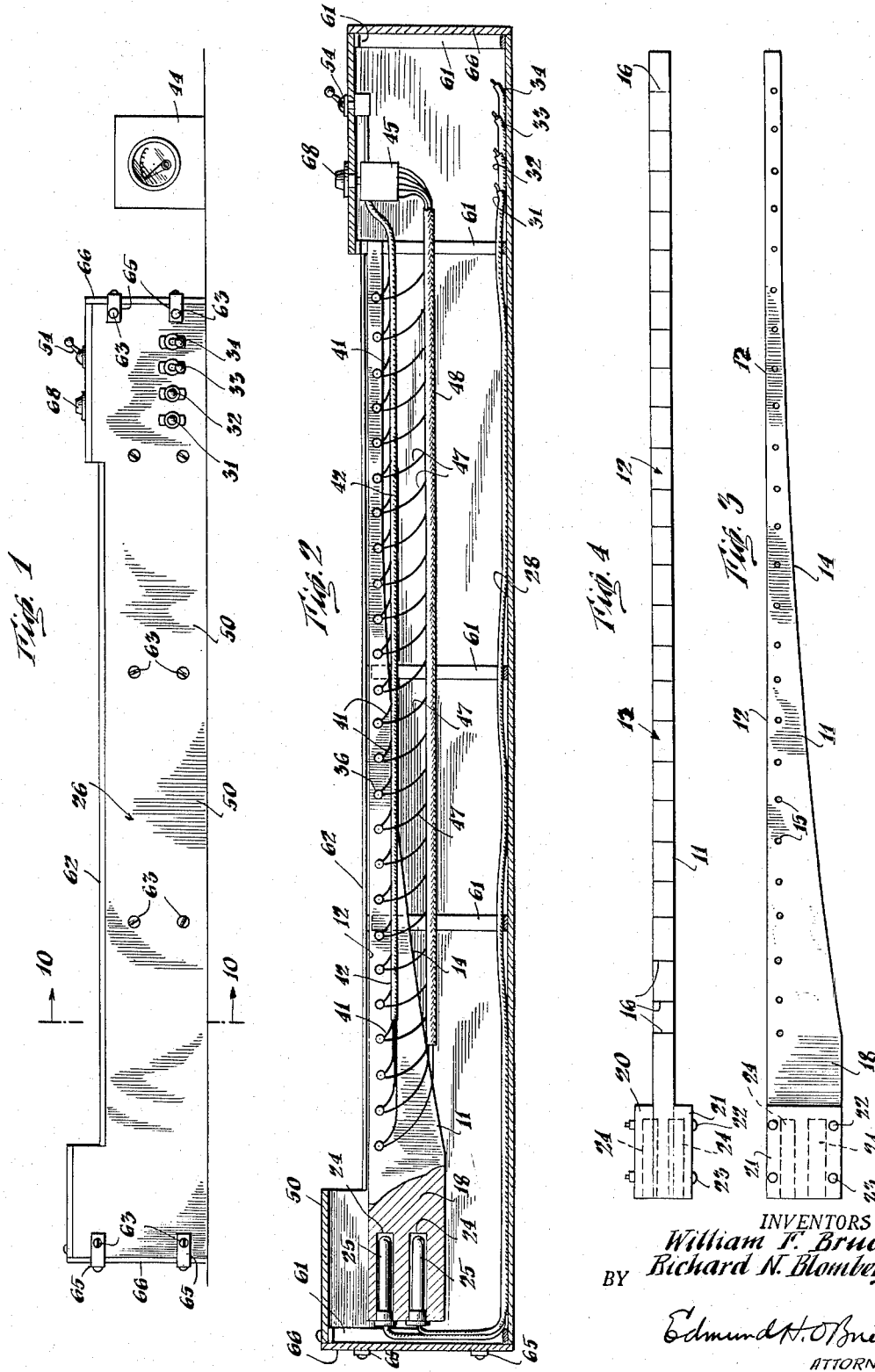
INVENTORS
William F. Bruce
Richard N. Blomberg
BY
Edmund H. O'Brien
ATTORNEY

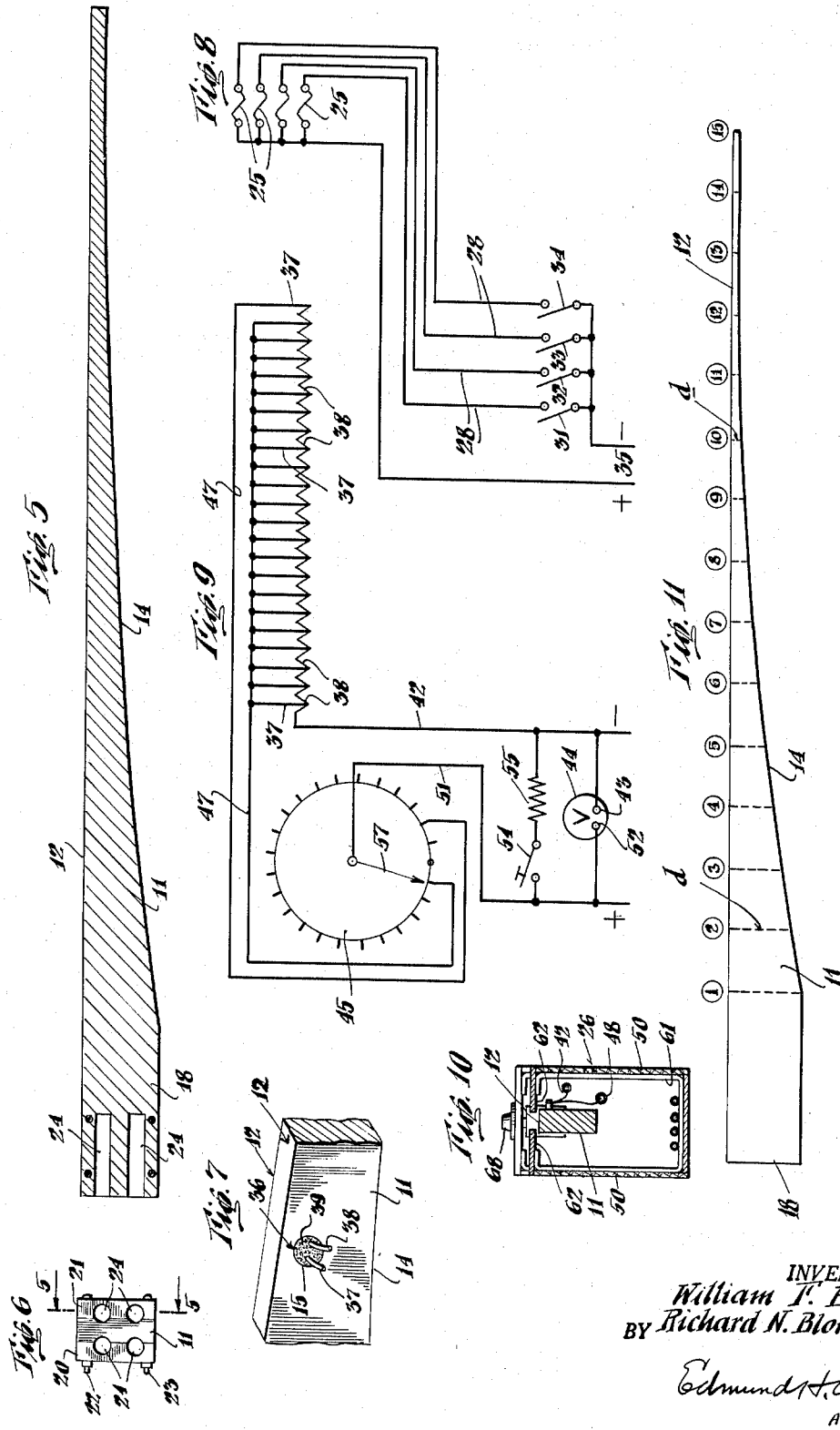

2,730,892
MELTING POINT BAR

William F. Bruce, Havertown, and Richard N. Blomberg, Ward, Pa., assignors, by mesne assignments, to American Home Products Corporation, New York, N. Y., a corporation of Delaware Application May 22, 1952, Serial No. 289,396

6 Claims. (Cl. 73—17)

This invention relates to a new and improved apparatus for the determination of melting points and decomposition temperatures of materials undergoing examination. It is equally applicable for use in the determination of these physical constants of both organic and inorganic substances.

It is frequently necessary, in research laboratories and elsewhere, to make accurate determinations of the temperature at which a substance undergoing examination melts or decomposes. These temperatures are termed, respectively, the "melting point" and the "decomposition temperature," and they must be determined accurately and with a fair degree of speed and convenience. It frequently happens that in the course of a day many such determinations are necessary.

Prior to our invention there has not been available any completely satisfactory apparatus for making such determinations. The forms of apparatus now available for laboratory use have generally been somewhat primitive in type, either not permitting rapidity of measurement or facility of use, or with the more convenient forms of apparatus, of such construction that accuracy in the determination of melting points and decomposition temperatures has generally not been possible. Excessive corrosion of the heated element has been common, limiting not only the useful life of the apparatus, but also the practical range of temperatures within which presently available melting point determination apparatuses can be used. In practical, everyday operation, the erratic and inaccurate results obtained, and the accumulation of oxidation products resulting from corrosion, have limited available devices of this type to the accurate determination of temperatures only up to about 200° C. or 250° C. Unfortunately, the temperatures above these and, in particular, temperatures up to about 350° C., are especially important in connection with decomposition temperatures since most organic substances which decompose do so within this more elevated range.

Many of the older methods utilizing relatively simple equipment and now used in laboratories require the expenditure of considerable time, and they uniformly fail to give accurate results when decomposition of the substance undergoing examination occurs. Considerable manipulation and the development of a high order of technique are necessary to secure results accurate event to a fair degree when the substance undergoes decomposition. In some procedures, for example, it is necessary to enclose the substance undergoing test in a capillary tube, and this not only requires time, but also requires considerable practice if the operation is to be carried out with even a modicum of facility.

While the classical method employing the Maquenne block is perhaps more satisfactory from the point of view of accuracy, the determination of these critical physical constants by means of this device is laborious and time-consuming. As a result, the number of determinations that can be carried out during a working day is greatly limited.

In one form of apparatus, which has been described as an improvement on the Maquenne block, a heated copper bar is provided, this bar being heated by means of electrical resistance elements positioned at one end of the bar. A range of temperatures along the surface of the bar is thus provided, varying from the high temperatures at the heated end to lower temperatures at the cooler end of the bar which is remote from the electrical resistance elements. By moving the material undergoing test along the surface of the heated bar to the point at which the substance just begins to melt, or just begins to undergo decomposition, a point on the heated surface having a temperature corresponding to the physical constant desired is located. The temperature at this point is then measured by means of a thermocouple, the thermoelectric pair being formed by the copper rod itself and an insulated constantan element which slides longitudinally with respect to the bar. This constantan element can be pressed into contact with the copper bar, and the electromotive force developed is measured by a potentiometer in circuit with the elements comprising the thermocouple. In this way only one thermocouple is necessary to measure the temperature at any point along the surface of the heated copper element, this thermocouple being established by pressing the constantan element against the copper in opposition to the action of a spring, the constantan element being released and the thermocouple elements separated when the pressure is released.

While the use of an electrical circuit, including a thermoelectric pair, for determining the temperature, constituted an advance over older methods, and the use of a single thermocouple might theoretically be considered to simplify the apparatus and reduce its cost, as a matter of fact the operation of this thermocouple, in practice, has not been very satisfactory. Moreover the mode of heating the melting point bar electrically from one end thereof by means of resistance elements wound around the bar, which also theoretically would appear to have definite advantages, has been generally unsatisfactory in practice, since considerable corrosion of the heated element and resistance coils has occurred. This greatly shortened the useful life of the apparatus and introduced uncertainty into its operation. Such corrosion has been especially apparent when an attempt is made to provide a temperature at the hot end of the heated bar above about 200°–250° C.

Thus, while the provision of a single constantan thermocouple element adapted to slide along the heated copper bar had the advantage of simplicity, in actual practice it resulted in erratic and uncertain determinations which were especially noticeable as the apparatus aged and products of oxidation accumulated thereon. It was a common occurrence with this form of apparatus to find that the greater the pressure with which the constantan element was pressed against the heated copper bar, the greater was the voltage delivered and indicated on the potentiometer, even at the same point on the surface of the bar. Inaccuracy of measurement even at very low temperatures was therefore experienced. Excessive corrosion has, moreover, prevented the use of the apparatus for the determination of more elevated temperatures, especially when the apparatus was no longer new and oxidation products had accumulated on its surface and heating elements.

Another defect in this form of apparatus which utilizes a heated copper element on which the substances undergoing examination are placed, is the frequent and excessive changes in temperature resulting from inequality of heat radiation and variations in the temperature of the ambient atmosphere. No attempt was previously made to shield the heated copper bar so as to reduce such radiation losses. Rapid changes in temperature along the surface of the bar during the working day has the result of introducing uncertainty and unreliability as to their correctness into the values as measured, as well as variability in the determinations as carried out in a day by day use of the apparatus. In the absence of satisfactory shielding it is not possible to secure an apparatus which, in daily operation, will consistently give a specific temperature, with negligible variation, at the same place on the heated element.

In an effort to avoid some of these difficulties, and to provide an apparatus in which the temperature of the heated element would vary from the hot end of the heated bar to its cool end in an approximately linear relationship, so that the temperature at any point on the bar could readily be estimated, equal increments of distance corresponding to equal differences in temperature, an improved apparatus of the heated bar or hot bench type was developed. In place of using the generally unsatisfactory thermocouple of the earlier construction in which a constantan element slidable along the surface of the heated bar was pressed into contact with that bar at the point at which the substance melted, the improved form of apparatus omitted the thermocouple arrangement entirely. Instead, the device was calibrated by determining points of known temperature by the use of substances of known melting points placed on the heated surface, these points of known temperature then becoming the key points from which temperatures at other portions of the heated element could be estimated. While avoiding the erratic results and inaccuracy characteristic of previous devices when employed under the circumstances described, calibration of the apparatus by means of substances of known melting point has not been entirely satsifactory, since it necessitates the additional labor of melting these substances of known melting point and determining these points. If only a single calibration were necessary this would not be so objectionable, but it is necessary for the operator in order to obtain reasonably accurate results to calibrate the device at regular intervals, especially each time that changes occur in the temperature conditions under which the determinations are carried out.

In providing a metallic element heated at one end in which the temperature differentials from the heated end to the cool end of the bar are substantially uniform for equal increments of length along the bar, it has been necessary to form this metallic element out of two different metals which are in contact with each other. The contact of dissimilar metals sets up an electrolytic couple which accelerates corrosion of the electrically more active metal. In fact corrosion difficulties with this type of hot bench are considerable, and they are increased by the manner in which the two-metal heated element is heated at its hot end. Owing to the considerable amount of corrosion and to other difficulties, the device has not been generally accurate for temperatures in excess of about 250° C., and, in fact, use of the apparatus for the determination of temperatures above 250° C. is not recommended by the manufacturer.

While the idea of providing a heated element with a substantially linear temperature gradient is undoubtedly advantageous, satisfactory operation has not at all times been possible, and it has not been always true that the temperature differential between points spaced equidistantly from each other along the hot bench was the same, regardless of their position on the surface of the heated element. This variability is, in part, the result of the failure of the apparatus to include any provision for avoiding sudden changes in temperature resulting from variations in the amount of heat radiated, or from changes in the temperature of the ambient atmosphere in the room in which the apparatus is used. This difficulty, coupled with the necessity for repeatedly calibrating the apparatus by the use of substances of known melting points, there being no means on the device for accurately measuring the temperature at any point along the heated element at points in between the calibrated points, has greatly reduced the usefulness of the hot bench type of apparatus.

In order to obviate these and other difficulties inherent in presently-available forms of apparatus for determining melting points and decomposition temperatures, and, in particular, to provide a form of apparatus of the heated bar type, similar in its more general aspects to the earlier devices discussed, but which apparatus will avoid the disadvantageous of the heated bar types of device which are now available, we have provided the herein described apparatus.

In place of the two-metal heated element of the hot bench form of apparatus, with its considerable corrosion especially at the higher temperatures, we have provided a heated element formed of a single metal, the upper surface of this heated element providing the surface, or "hot bar" on which the substances undergoing examination are placed and melted or decomposed. We have, moreover, provided a shaped metallic element which is heated, this bar being so shaped as to secure an approximately linear temperature gradient on the operating surface thereof so that, for equal length increments along the surface of the heated element, equal differentials in temperature exist. This is accomplished, not by the use of an objectionable two-metallic system wherein the heat is conducted along the heated element by two metals of different heat conductivities as in the hot bench type of apparatus, but by shaping the single metal heated element (or "bar") so that heat is conducted along the shaped bar by a progressively smaller mass of metal, thereby insuring the desired approximately linear temperature gradient on its operating surface. By thus utilizing a progressively limited heat conduction, in place of depending on heat losses by radiation to regulate the temperature of the heated element so as to provide an approximately linear temperature gradient, we have practically applied the Stephan-Boltzman law of heat radiation to a problem of heat conduction. Radiation losses, in our form of improved apparatus, can thus be minimized and kept constant by the provision of heat insulating means, since the distribution of temperature along the bar in our apparatus is regulated by control of the heat conduction by properly shaping the heated element, and no reliance need be placed on heat losses occurring as a result of radiation from the heated element.

In place of the single thermocouple of earlier forms of apparatus as constituted by the heated element itself and a constantan element adapted to be pressed into contact with the heated element at various points along its surface, we have provided a plurality of approximately equidistantly-spaced thermocouples which are permanently positioned, preferably in small apertures provided adjacent the operating surface of the heated element. These thermocouples are each constituted by two dissimilar metals, both being entirely separate from and electrically insulated from the metal of the heated element. In a suitable case these equidistantly spaced thermocouples could be replaced by suitable small bulb thermometers, although we prefer to use a series of thermocouples, all electrically connected through a single potentiometer for observing the indicated temperature. In this way the necessity for calibration by melting substances of known melting point on the operating surface of the heated element is avoided, and the temperature at any point adjacent a thermocouple can be accurately measured, the temperature at points in between thermocouple locations being accurately estimated by measuring the distances to points of known temperature, since the temperature gradient along the operating surface is substantially linear.

Since radiation of heat forms a minor part of the operation of our improved apparatus (as it does in the operation of older forms of heated bar apparatus) it is evident that we may effectively shield our heated element so that inaccuracy due to variations in the amount of heat radiated, or in the temperature of the atmosphere in the room in which the device is utilized, will not occur. In this way erratic results and inaccuracies in the determination of temperature are avoided.

As difficulties, as the result of corrosion, first become important at the heated end of this type of heated bar or hot bench apparatus, we have provided an improved electrical heating means, so designed as greatly to reduce corrosion and permit the use of the device in the determination of more elevated temperatures than previously possible with this form of device. We employ a plurality of individual heating elements, the individual heat output of each being variable and subject to electrical control. The heat input from the heaters is spread over a wider area, thereby reducing corrosion due to excessive heating at any one point, and insuring more uniform heating, since variations due to small changes in the voltage are reduced to insignificance.

It is, accordingly, one of the objects of this invention to provide a new and improved apparatus for determining the melting points and decomposition temperatures of organic compounds and chemical substances and mixtures, which apparatus will be usable over a considerable range of temperatures, and which will permit the rapid and precise determination of these physical contants for materials melting or decomposing over a wide range of temperatures.

It is another object of our invention to provide melting point determination apparatus wherein a heated metallic element is utilized, this heated element being preferably formed as a shaped plate or bar and providing an operative surface on which the substance undergoing test may be placed, and being further so proportioned as to provide a substantially linear distribution of temperatures over the operative surface thereof within a useful temperature range.

It is still another object of our invention to provide an apparatus for the determination of melting points and/or decomposition temperatures, which apparatus utilizes a metallic element which is heated at one end thereof, this heated element being of a single metal and so shaped as to provide a substantially uniform temperature gradient along points linearly spaced from each other on the operating surface thereof, this heated metallic member being further provided with a plurality of equidistantly spaced, permanently fixed, temperature-determining devices which are positioned so as to determine the temperature at various points along the operating surface of the heated element, said devices being thermally in contact with the heated element but electrically insulated therefrom.

A further object of our invention is to provide melting point determination apparatus of an improved construction wherein the heated metallic element on which these substances undergoing test are melted or decomposed is arranged with suitable shielding means adapted to reduce radiation therefrom to a minimum, whereby errors due to variation in the amount of heat radiated and changes in the temperature of the ambient atmosphere are greatly reduced, thus permitting the uniform securing of accurate values for these constants of the substances undergoing test.

Still another object of our invention is to provide new and improved heating means for heating the metallic element from one end thereof, said improved heating means, together with the use of a single metal for the heated metallic element, permitting heating to higher temperatures without excessive corrosion, thereby providing for use of the apparatus to determine temperatures within the very useful elevated range (especially as regards decomposition), up to 350° to 400° C.

Still a further object of our invention is to provide an improved apparatus for the determination of these critical constants, i. e. melting points and decomposition temperatures, wherein the operating surface of the heated element, above the temperature determining or recording devices, is provided with a graduated scale which permits ascertaining the temperature at any point on the operating surface at a point in between those at which the temperature is determined or recorded by said devices.

The foregoing objects, as well as additional objectives of our invention, will be evident from the ensuing disclosure of a preferred embodiment thereof. This apparatus is best understood in connection with the annexed drawings, wherein:

Fig. 1 is a view in side elevation of the entire apparatus as enclosed in a protective casing, the view including the potentiometer shown as separate from the apparatus;

Fig. 2 is an elevational view of the apparatus as seen with one of the sides of the enclosing casing removed, the left-hand end of the heated element and certain portions of the casing and its supporting brackets, for convenience, being illustrated in section;

Fig. 3 is a view in elevation of the heated metallic element showing the apertures in one side thereof in which the temperature indicating devices are positioned;

Fig. 4 is a top view of the heated element, this view showing the graduation marks on the upper edge portion or operating surface thereof;

Fig. 5 is a longitudinal cross-sectional view of the heated element taken substantially on the line 5—5 of Fig. 6;

Fig. 6 is an end view of the heated element at its end of greatest depth, this view showing the sockets in which the electrical heating elements are adapted to be positioned, but with those heating elements removed;

Fig. 7 is an enlarged view of part of the heated element showing one of the thermocouple temperature-indicating devices positioned in one of the apertures provided therefor in the side portion of the metallic element, adjacent the operating surface thereof;

Fig. 8 is a wiring diagram showing the connections to the main power line and the control switches by which the electrical heating units for heating the heated element may be turned on or off, as desired, either singly, or together;

Fig. 9 is a wiring diagram showing the connections to the main power line, and the electrical conduits by means of which the individual thermocouples may be connected to a potentiometer through a suitable tap switch having a plurality of contact points whereby the temperature may be determined at any of the points along the heated element at which thermocouples are positioned;

Fig. 10 is a transverse cross-sectional view showing the heated element and the surrounding protective casing, this view being taken on the line 10—10 of Fig. 1; and Fig. 11 is a diagrammatic representation showing the shape of the curve of the lower portion of the plate when an aluminum plate is utilized for the heated element, its shape being so designed as to provide for a substantially linear distribution of temperature over the operating surface of the heated element. This diagrammatic representation shows the ordinate distances as measured downwardly at equal intervals from a horizontal base line, and the relative numerical values of these ordinate distances, defining the shape of the bottom curve, are tabulated below.

Our improved apparatus includes the heated element 11, preferably formed of a relatively thin aluminum plate. This heated element is heated at one end thereof, and its upper surface 12 constitutes the operating surface on which the substances undergoing test are placed in order that they may melt, or may decompose without melting. For this purpose, if desired, the operating surface 12 may be slightly troughed transversely, or it may be a substantially plane surface.

Instead of constructing the heated element 11 in the form of a thin aluminum plate, it may be formed as a block of metal of a greater thickness, such, for example, as in pyramidal or frusto-pyramidal shape. Other convenient forms may be utilized, but for most purposes we have found the thin plate form to be most satisfactory for the heated element 11.

The lower edge portion of heated element 11 is curved as shown at 14, see particularly Figs. 2, 3, 5 and 11. The precise form that this curve may take for a relatively thin plate of aluminum or aluminum alloy is more fully explained hereinafter. It is neecssary that the mass of the plate 11 be so distributed with respect to its linear extent, from its heated end outwardly, that a substantially uniform temperature gradient is maintained along the operating surface 12. In other words, for substantially equidistant points along the operating surface 12, uniform differentials in temperature exist, regardless of whether the points are adjacent the hot end of the bar or adjacent the cooler end thereof, within the limits of the length of the particular portion of the heated element which is employed in the determinations of melting point or of the decomposition temperature.

The heated element 11 is therefore so shaped as to provide, per unit of length, a progressively smaller mass of metal proceeding from the hot end to the cool end thereof. Since the quantity of heat transmitted depends on the cross-sectional area of the heated element, the approximately linear temperature differentials throughout the working extent of the heated element result from a progressively limited conduction of heat through the heated element or bar. Radiation of heat is minimized and held relatively constant by providing an insulating box or casing around the heated element, as subsequently explained.

The heated element 11 is so shaped by properly forming the curve 14 of its lower edge portion, in accordance with the Stephan-Boltzman law of heat radiation as applied to heat conduction, that the quantity of heat transmitted lengthwise of the heated element is such as to secure the approximately linear distribution of temperature therein. In order to secure this result radiation of heat from the heated element must be minimized and reduced.

Adjacent the upper or operating surface of the heated element 11, and just below this surface, there is provided a series of small apertures 15 which are equidistantly spaced between centers along substantially the entire useful length thereof. Each of these apertures is adapted to receive a temperature indicating device, which may be a small bulb thermometer or, preferably, an electrical thermocouple element. These apertures or cavities 15 are made as small as possible in order to interfere to a minimum with the conduction of heat through the heated element 11 to the sample and to other parts of this heated element. On the operating surface 12 immediately above each of these apertures there is inscribed, while the bar is heated and at operating temperature, a series of graduation marks, indicated by numeral 16. Since the distance between each pair of adjacent apertures 15 is the same throughout the entire useful length of the heated element 11, graduation marks 16 are spaced at the same interval on the operating surface 12, each mark being preferably inscribed on the metal of the operating surface immediately over each of the apertures 15.

Merely as illustrative, and as in no sense limiting the scope of our invention, we may note that in one embodiment the apertures 15 have been spaced from each other at a distance of 20 millimeters between centers. The individual graduation marks 16 on the calibrated operating surface 12 have therefore also been spaced at a distance of 20 millimeters from each other. The heated element has been so constructed by shaping the curve 14 of its lower edge portion that the temperature differential between any two adjacent points, as marked by adjacent calibration marks on the operating surface 12 of the bar, is 20° C. when the heated element is heated by the electrical resistance heating coils. Since the graduation marks are 20 millimeters apart, a distance of one millimeter along the operating surface represents a temperature differential between the two points spaced from each other by this distance of 1° C., since the distribution of temperature along the operating surface of the heated element 11 drops substantially uniformly, or as a linear function, along the operating surface from the hot to the cool end thereof.

There may, of course, be any number of individual apertures 15 each designed to receive a thermocouple or other temperature indicating device, and for convenience we have illustrated a construction in which there are twenty-three such apertures, see particularly Figs. 2 and 3. Of course the distance between thermocouples may be varied as desired, and the number of individual thermocouples, or other temperature indicating devices, provided along the heated element 11 could be made greater, or less, as desired, depending on convenience and on the operating temperature range through which the melting point determination apparatus is designed for operation.

At the left-hand or heated end 18 of the heated element 11 (as viewed in Figs. 2 to 5) the thickness of the plate is increased by bolting thereto on either side thereof, two lateral blocks or plates 20, 21. The plates 20, 21 are secured to the main body of the heated plate element 11 by means of heated bolts 22 and 23, and they serve to enlarge the thickness of the heated element at the end thereof, 18, at which the heating elements are to be positioned. The end of the enlarged structure thus resulting is bored out as shown in Figs. 2, 5 and 6 to provide bore holes 24, each of which is adapted to receive an electrical heating element 25 (Fig. 2). These heating elements may be ordinary soldering iron heaters having an electrical heating coil, preferably enclosed in brass casings, and in one embodiment of our invention we have successfully used soldering iron heating coils of about 300 watts power.

In assembling the melting point determination apparatus it is preferable to lubricate the electrical heaters 25 after they are inserted in place in the apertures 24 by means of a silicone fluid, preferably a silicone fluid of relatively high boiling point, in order to minimize corrosion at this portion of the apparatus. In place of electrical heating elements, heating by some other means, as by means of a gas flame, could also be utilized, but we much prefer to utilize electrical resistance heating elements of the type illustrated and described.

Electrical power to each of the electrical heating elements 25 may be controlled by means of a separate switch, the manually manipulated portions of these switches protruding through the casing 26 which surrounds the heated element 11 and the electrical conduits. In the embodiment shown these switches extend through the casing 26 at that end of the apparatus which is remote from the end in which the heating elements 25 are positioned. As shown in Fig. 2 and schematically in the wiring diagram Fig. 8, electrical conduits, designated as 28, extend between the heaters 25 and the individual switches for controlling the heaters bearing numerals 31, 32, 33 and 34. Plug 35 in the circuit is adapted to be plugged into a suitable source of power, such as ordinary 110–115 volt alternating current. By this arrangement it is possible to turn off one or more of the heating elements 25 as desired, and to have any number of heating elements, up to four operating at the same time.

In one embodiment of our invention we have found that by utilizing soldering iron heaters of 300 watts, when the device is operated with one heater 25, a maximum temperature of about 300° C. is attained at the hot end 18 of the heated element 11. Two heaters will provide a temperature of 400° C. at the hot end, which is ordinarily as high a temperature as it is desirable to maintain at this end since most substances will either melt or decompose at temperatures of below 400° C. It is possible, of course, to secure higher temperatures by turning on three or even four heaters, but ordinarily we prefer to operate with two heaters turned on at one time, two of the electrical heaters 25 being held in reserve. In this way, it is possible to maintain any temperature, as desired, and since replacement units are available for heating or for interchange, interruptions in service due to failure of the electrical heating means are extremely unlikely.

It is also possible to operate so that all four heating elements are controlled by one switch, the circuit including a variable transformer. In this way, the temperature at each individual heater 25 need not be any higher than that needed to achieve the desired heat input, the load of heating being divided between four individual electrical heaters 25, all of which are utilized at one time, and all being controlled from one switch and by means of the variable transformer.

As shown more especially in Figs. 2 and 7, the thermocouples positioned in the apertures 15 of the heated plate element in proximity to the operating surface 12, which are designated generally by the numeral 36, each include a chromel terminal 37 and an alumel terminal 38, both insulated from the heated element by means of insolute cement 39. Thermocouples comprising other dissimilar metals may also be utilized, but we have found chromel-alumel thermocouples to give very satisfactory results. Ordinary thermometers of a sufficiently small size, such as small bulb thermometers, could also be used in the apertures 15 in place of thermocouples, but ordinarily there is no particular advantage in this.

As shown in Fig. 2, and in the wiring diagram Fig. 9, the alumel thermocouple terminals all lead by means of connecting wires 41 to a common conductor 42 which is secured to one terminal 43 of potentiometer 44. All conduits 41, 42 are of alumel. Chromel terminals 37 of the thermocouples are each provided with a separate lead from each of the twenty-three thermocouples illustrated to a 23-point selective tap switch 45. In Fig. 2 each of these wires from individual chromel thermocouple terminals is designated by the same numeral 47. For convenience, all 23 of the wires 47 may be united into a single bundle of wires 48, this bundle keeping the wires together inside of the casing 26 which surrounds heated element 11 and electrical conductors 28, 41, 42, 47 and 48.

The selective tap switch 45, which in the embodiment illustrated is provided with 23 points although, of course, it may have a fewer or greater number thereof, is of rotary type and permits closing the circuit through the potentiometer 44, this circuit including any one of the chromel thermocouple terminals and its corresponding alumel terminal. Lead 51 from the rotary arm 57 of the tap switch 45 is connected by a conduit to the other terminal 52 of the potentiometer 44. Toggle switch 54 extends across the circuit between the common alumel conduit 42 and lead 51, this switch being in circuit with resistance 55 which, in a typical case, may be of 70 ohms. Electrical conduits 42 and 51 lead to potentiometer 44 which may conveniently be a millivoltmeter.

When the toggle switch 54 is closed the potentiometer 44 will indicate a difference in potential in millivolts which is proportional to the temperature at that point along the heated element 11 at which the particular thermocouple, selected by means of rotary tap switch 45, is positioned. The particular thermocouple point in the heated element 11 and along its operating surface 13, from thermocouple 1 to thermocouple 23 in the illustrative arrangement shown, is thus determined by movement of the rotary arm 57 of tap switch 45. It is thus possible to secure a visual indication on the potentiometer 44 of the temperature as registered by any of the equidistantly spaced thermocouples, each of these thermocouples being positioned in an aperture 15 of the heated element 11 adjacent operating surface 12.

The housing or casing 26 surrounding the heated plate element 11, the heater elements 25, and the various conduits and switches comprising the electrical circuit elements, may conveniently be formed of transite, which is a compressed asbestos product. However other non-conducting materials such as bakelite could also be used, and it is possible to employ most any non-softening, thermally-resistant plastic, or even a natural material, such as wood. While metal could also be utilized for the casing 26, ordinarily we prefer to utilize transite, since it is light, electrically and heat insulating, inexpensive, and capable of being readily cut to shape to provide an effective radiation shield.

The casing 26 includes side, top, bottom and end panels, and serves to lessen losses of heat due to radiation, and to protect the heated element 11 from drafts and air currents which would result in uneven temperatures along the operating surface 12 thereof. The panels forming the housing 26 are supported by a plurality of metal brackets 61. Two separate strips 62 (Fig. 10) supported by metal brackets 61 are positioned on either side of the heated element 11, and they form the top of the housing or casing 26 at this point, but they are so constructed as to provide between them a limited area of access to the operating surface 12. This area is so limited in extent that losses of heat as a result of radiation therethrough are not important.

The side panels 50 of transite or similar material comprising the casing 26 are secured by means of bolts 63 to brackets 61 (Fig. 1), and bent metal strips 65 support the end panels 66 in such a way that they may be readily removed in order to gain access to the interior of the housing and to the electrical resistance heating elements 25. The four switches 31, 32, 33 and 34, which are used for turning on and off current to the heating elements 25, protrude through side panel 50 of the casing adjacent the bottom thereof, while the handle 68 controlling the rotary arm 57 of rotary tap switch 45 protrudes through an upper panel of the casing at that end remote from the heating element 25. The toggle switch 54, controlling the circuit which includes potentiometer 44, also protrudes through the casing at this end, so that it is readily available to the operator.

In the diagrammatic respresentation showing the shape of the curve 14 for the lower edge portion of the heated element 11 when a thin aluminum plate is utilized (Fig. 11), fifteen points are indicated as abscissas along the upper or operating surface 12, while the ordinate distances measured downwardly at each of these fifteen points to the curved edge 14 is indicated by the letter $d$. Point 1 is at the hot end of the operating surface 12, immediately over the point at which curved edge 14 joins the hot end portion 18 containing the heaters 25, while point 15 is the last useful point on the operating surface at the cool end of the bar.

The ordinates of curve 14 for each of these 15 points are given in millimeters below, it being understood, of course, that this shape for the curve 14 is limited to a heated element in the form of a thin aluminum plate, each point from 1 to 15 being equidistantly spaced from adjacent points on either side by a distance of 20 millimeters.

| Point: | Distance from operating surface, mms. |
| --- | --- |
| 1 | 60 |
| 2 | 48 |
| 3 | 41 |
| 4 | 34 |
| 5 | 27 |
| 6 | 21 |
| 7 | 16 |
| 8 | 11.5 |
| 9 | 8.5 |
| 10 | 6.5 |
| 11 | 5.1 |
| 12 | 4.2 |
| 13 | 3.4 |
| 14 | 2.6 |
| 15 | 1.8 |

(Points are 20 millimeters apart, measured horizontally.)

In using the apparatus to determine the melting point of the substances, or the decomposition temperature in the case of those substances which decompose before they melt, a small amount of the material to be tested is moved along the operating surface 12 of the heated element 11 until a point is found thereon at which the substance either just begins to melt, or just begins to decompose. If this point happens to fall on one of the graduations 16 on the operating surface 12 at which point the temperature is measured by one of the thermocouples, it is of course possible by selecting the proper circuit by means of the rotary tap switch 45, to measure the temperature at this point, the value being directly indicated on the potentiometer 44. In this case there is a direct value obtained for the melting point of decomposition temperature. On the other hand, and as more usually happens, if the point at which incipient melting or decomposition occurs is located between graduation marks on the operating surface 12, the temperature at this point is determined by interpolation between temperatures as measured at the adjacent graduation marks at which thermocouples are located, since the temperature gradient along the operating surface is substantially linear.

As an example, if the distance between graduation marks is 20 millimeters, and the temperature differential as measured by two adjacent thermocouples, one on either side of the point on the operating surface 12 at which the material melts, is 20° C., the melting point is readily determined simply by measuring the distance in millimeters from the point at which the substance melts (or decomposes) to the nearest adjacent graduation mark, each millimeter, in this illustrative case, representing a temperature gradient of 1° C.

When using our apparatus to determine the melting point or decomposition temperature of a material which might corrode the aluminum or aluminum-alloy out of which the heated element is formed, or which might conceivably alloy with the metal of this element along the operating surface thereof, we generally prefer to place the material to be tested on the thin foil of resistant metal, such as silver, tantalum or platinum. In this way, corrosion and alloying are avoided, without in any way changing the manner in which our apparatus is used.

Also, while we have shown a rotary tap switch 45 with twenty-three contact points it is not of course necessary to have any particular number of thermocouples, or any particular number of contact points on the rotary tap switch. It is only necessary that the distance along the heated element between points of known temperature should not be too great, and ordinarily we prefer to place the temperature determining elements 36 close enough together so that the temperature at any point between those at which the temperature is measured can be known with a fair degree of certainty by interpolation. For some purposes the thermocouples 36 can be spaced further apart than for other purposes, and the spacing will ordinarily be determined by the accuracy with which it is desired to estimate temperatures along the bar by interpolation between known temperatures as measured by the thermocouples.

We claim:

1. Melting point determination apparatus which comprises a longitudinally-extending heated element provided with an operating surface on which substances to be melted may be placed, said operating surface being shielded to reduce radiation losses, and having a substantially uniform temperature gradient for substantially equal length intervals along said operating surface so that the temperature varies by substantially equal increments between points at substantially equidistant intervals from each other along said operating surface, a plurality of electrical thermocouples positioned in contact with said heated element at substantially equidistant points below the operating surface thereof and adapted to measure the temperatures along said operating surface at a plurality of points which are spaced at substantially equidistant intervals from next adjacent points, a single potentiometer for indicating the temperatures as determined by said thermocouples, electrical circuit means electrically connecting said thermocouples and said potentiometer, and means for heating said heated element adjacent one end thereof.

2. Melting point determination apparatus comprising a longitudinally-extending heated element formed of a single metal and including an operating surface on which substances to be melted may be placed, said heated element being heated at one end thereof, and being so shaped, from its heated end outwardly, that said operating surface has a substantially uniform temperature gradient for substantially equal length intervals thereon when said heated element is heated, said temperature varying by substantially equal increments for points at substantially equidistant intervals from each other along said operating surface, a plurality of thermocouples positioned in contact with said longitudinally-extending heated element at substantially equidistant points therealong so as to determine the temperatures on said operating surface at a plurality of points along said operating surface which points are spaced at substantially equidistant intervals with respect to adjacent points, a single potentiometer for visually indicating said temperatures, electrical conduit means connecting said thermocouples and said potentiometer, a radiation shield substantially completely enclosing said longitudinally-extending heated element and positioned with respect thereto to protect said heated element from drafts and air currents which otherwise would result in uneven temperatures along said operating surface thereof, and means for heating said heated element adjacent said heated end thereof.

3. Melting point determination apparatus comprising a longitudinally-extending heated element formed of a single metal and including an operating surface on which substances to be melted may be placed, said heated element being heated at one end thereof, and being so shaped, from its heated end outwardly, that said operating surface has a substantially uniform temperature gradient for substantially equal length intervals thereon when said heated element is heated, said temperature varying by substantially equal increments for points at substantially equidistant intervals from each other along said operating surface; a plurality of thermocouples positioned in equidistantly-spaced apertures provided in said longitudinally-extending heated element in proximity to the operating surface thereof so as to determine the temperature on said operating surface at a plurality of points therealong, which points are spaced at substantially equidistant intervals with respect to adjacent points; a potentiometer for visually indicating said temperatures; electrical conduit means connecting said thermocouples and said potentiometer; a radiation shield substantially completely inclosing said heated element but permitting access to said operating surface, said shield being effective to reduce radiation heat losses therefrom; and means including a plurality of electrical resistance heaters for heating said heated element at one end thereof.

4. Melting point determination apparatus comprising a longitudinally-extending heated element formed of a single metal and including an operating surface on which substances to be melted may be placed, said heated element being provided at one end thereof with a plurality of heater receiving cavities, and being so shaped, from its heated end outwardly, that said operating surface has a substantially uniform temperature gradient for substantially equal length intervals thereon when said heated element is heated, said temperature varying by substantially equal increments for points at substantially equidistant intervals from each other along said operating surface; a plurality of thermocouples positioned in equidistantly-spaced apertures provided in said longitudinally-extending heated element in proximity to the operating surface thereof so as to determine the temperatures on said operating surface at a plurality of points therealong, which points are spaced at substantially equidistant intervals with respect to adjacent points; a potentiometer for visually indicating said temperatures; electrical conduit means connecting said thermocouples and said potentiometer; a radiation shield substantially completely inclosing said heated element but permitting access to said operating surface, said shield being effective to reduce radiation heat losses therefrom; and means for heating said heated element at one end thereof, said means including a plurality of electrical resistance heaters positioned in said heater receiving cavities, electrical circuit means connecting said heaters to a source of electrical power, and means for controlling the supply of electrical power thereto whereby the temperature of said electrical heaters may be controlled.

5. Melting point determination apparatus comprising a longitudinally-extending heated element formed of aluminum and including an operating surface on which substances to be melted may be placed, said heated element being provided at one end thereof with a plurality of heater receiving cavities, and being so shaped, from its heated end outwardly, that said operating surface has a substantially uniform temperature gradient for substantially equal length intervals thereon when said heated element is heated, said temperature varying by substantially equal increments for points at substantially equidistant intervals from each other along said operating surface, and said operating surface of said heated element being provided with graduation marks thereon spaced substantially equidistantly along said surface; a a plurality of thermocouples positioned in equidistantly-spaced apertures provided in said longitudinally-extending heated element in proximity to the operating surface thereof so as to determine the temperatures on said operating surface at a plurality of points therealong, which points are spaced at substantially equidistant intervals with respect to adjacent points; a potentiometer for visually indicating said temperatures; electrical conduit means connecting said thermocouples and said potentiometer; a radiation shield substantially completely inclosing said heated element but permitting access to said operating surface, said shield being effective to reduce radiation heat losses therefrom; and means for heating said heated element, said means including a plurality of electrical resistance heaters positioned in said heater receiving cavities, electrical circuit means connecting said heaters to a source of electrical power, and means for controlling the supply of electrical power supplied thereto whereby the temperature of said electrical heaters may be controlled.

6. Melting point determination apparatus comprising a longitudinally-extending heated element formed of a single metal and including an operating surface on which substances to be melted may be placed, said heated element being heated at one end thereof and being so shaped, from its heated end outwardly, that said operating surface has a substantially uniform temperature gradient for substantially equal length intervals therealong when said heated element is heated, said temperature varying by substantially equal increments between points at substantially equidistant intervals from each other along said operating surface, said heated element being in the form of a relatively thin aluminum plate with a substantially straight upper edge portion constituting said operating surface and a curved lower edge portion whose curved outline is defined by the following ordinates in millimeters for points spaced equidistantly form each other at a distance of 20 millimeters as measured along said straight upper edge portion, said ordinates being measured from said straight upper edge and at right angles thereto.

References Cited in the file of this patent

UNITED STATES PATENTS

| | | |
|---|---|---|
| 2,015,838 | Borden et al. | Oct. 1, 1935 |
| 2,336,238 | Fordyce et al. | Dec. 7, 1943 |

FOREIGN PATENTS

| | | |
|---|---|---|
| 815,706 | Germany | Oct. 4, 1951 |